(12) United States Patent
Welter

(10) Patent No.: US 8,764,093 B2
(45) Date of Patent: Jul. 1, 2014

(54) FIXTURE FOR A COMPONENT AND A FIXTURE MOUNT

(75) Inventor: Patrick Welter, Lachambre (FR)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 404 days.

(21) Appl. No.: 11/817,087

(22) PCT Filed: Feb. 14, 2006

(86) PCT No.: PCT/EP2006/050917
§ 371 (c)(1),
(2), (4) Date: Oct. 23, 2007

(87) PCT Pub. No.: WO2006/089850
PCT Pub. Date: Aug. 31, 2006

(65) Prior Publication Data
US 2008/0150316 A1    Jun. 26, 2008

(30) Foreign Application Priority Data
Feb. 25, 2005    (DE) .......................... 10 2005 009 277

(51) Int. Cl.
*B60J 3/02*    (2006.01)
(52) U.S. Cl.
USPC ........................................................ 296/97.9
(58) Field of Classification Search
USPC ........................... 296/97.1, 97.9, 97.12, 97.13
See application file for complete search history.

(56) References Cited

U.S. PATENT DOCUMENTS

| | | | |
|---|---|---|---|
| 3,017,217 A | 1/1962 | Keating | |
| 4,569,552 A | 2/1986 | Marks | |
| 4,913,484 A | 4/1990 | Dowd et al. | |
| 5,499,854 A | 3/1996 | Crotty, III et al. | |
| 5,697,140 A | 12/1997 | Crotty, III et al. | |
| 6,068,323 A | 5/2000 | Brown et al. | |
| 6,595,571 B1 * | 7/2003 | Krebs et al. | 296/97.9 |
| 6,830,279 B2 * | 12/2004 | Beaver | 296/97.9 |
| 2002/0175535 A1 * | 11/2002 | Beaver | 296/97.9 |

FOREIGN PATENT DOCUMENTS

| | | |
|---|---|---|
| DE | 10301663 A1 | 4/2004 |
| EP | 0 346 158 | 12/1989 |
| JP | H08207563 A | 8/1996 |
| JP | 2002052928 A | 2/2002 |

* cited by examiner

*Primary Examiner* — Glenn Dayoan
*Assistant Examiner* — Gregory Blankenship
(74) *Attorney, Agent, or Firm* — Dickinson Wright PLLC

(57) ABSTRACT

The invention concerns a fixture, for example a sun visor used in a vehicle, comprising a covering element provided with a latch member and a basic body rotatably carried on a spindle element. The spindle element includes a positioning member. When the covering element and basic body are counter-rotated on the spindle element, the positioning member moves the latch member from a mounting position to a fitted position. The fixture when installed can be locked by means of the latch member on a fitted body which, for example, may be an interior trim piece of the vehicle.

9 Claims, 5 Drawing Sheets

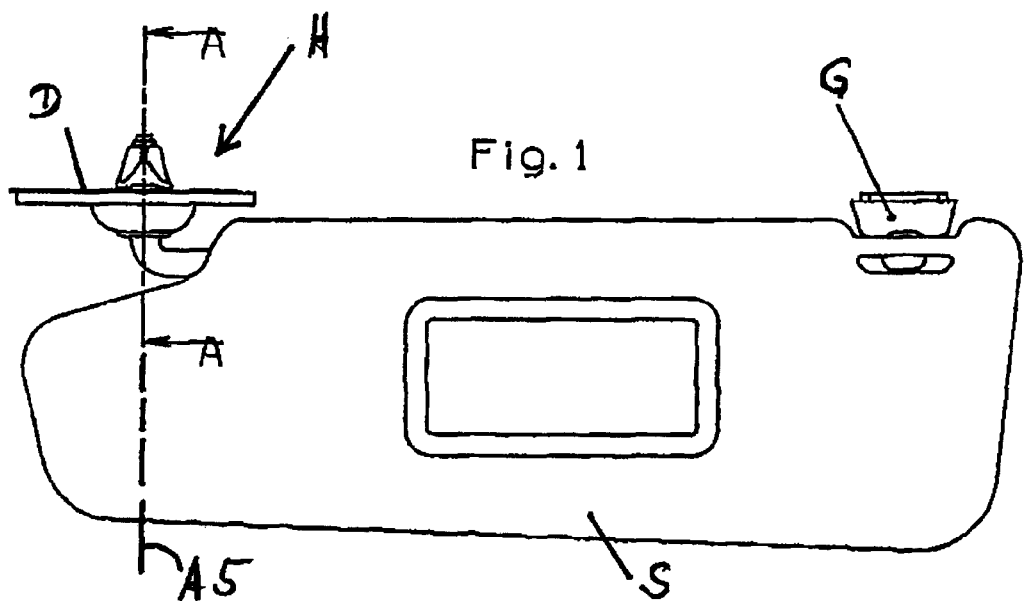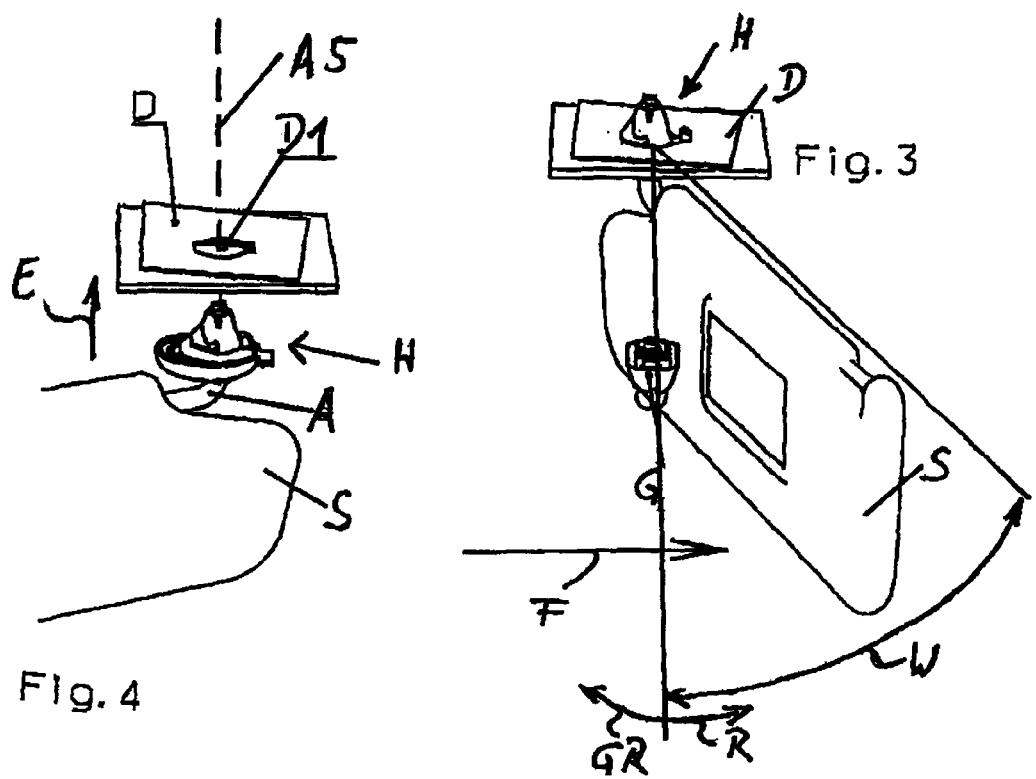

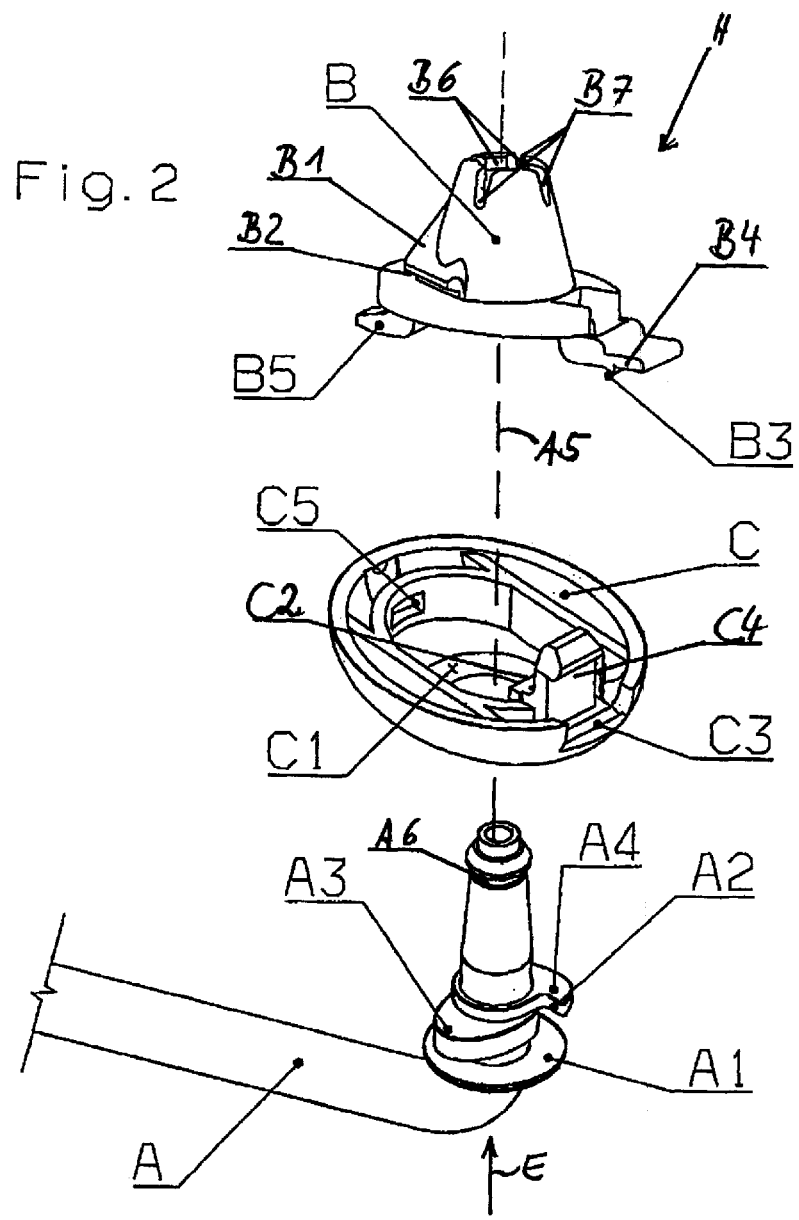

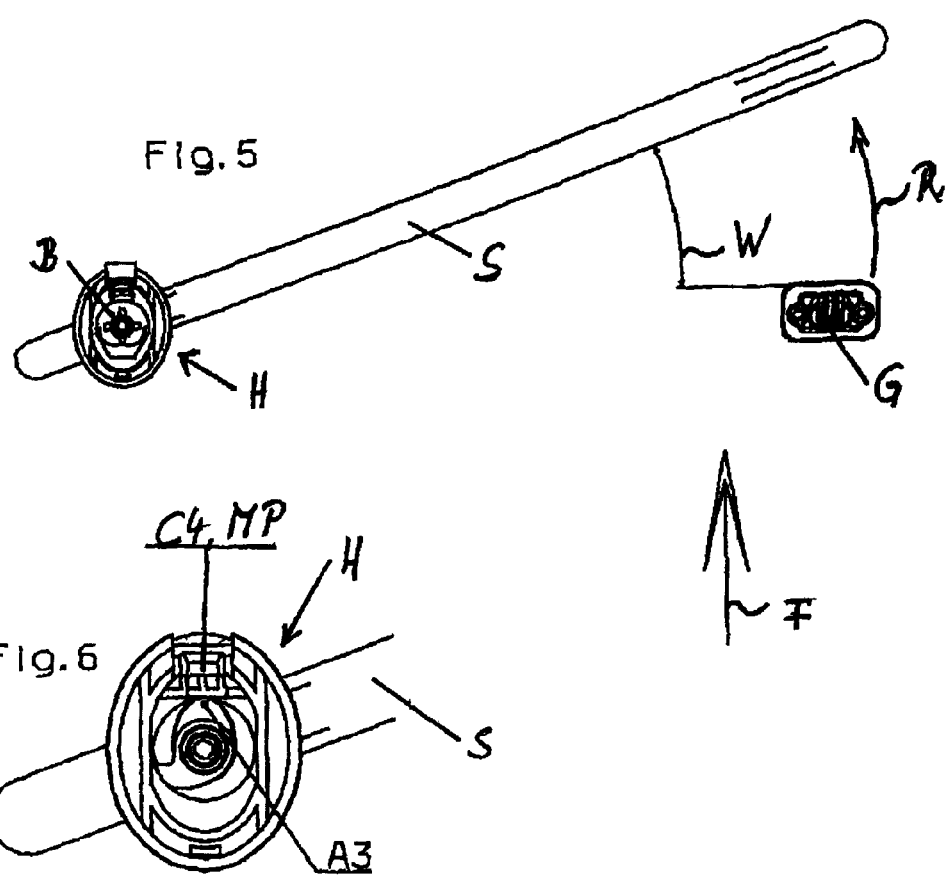

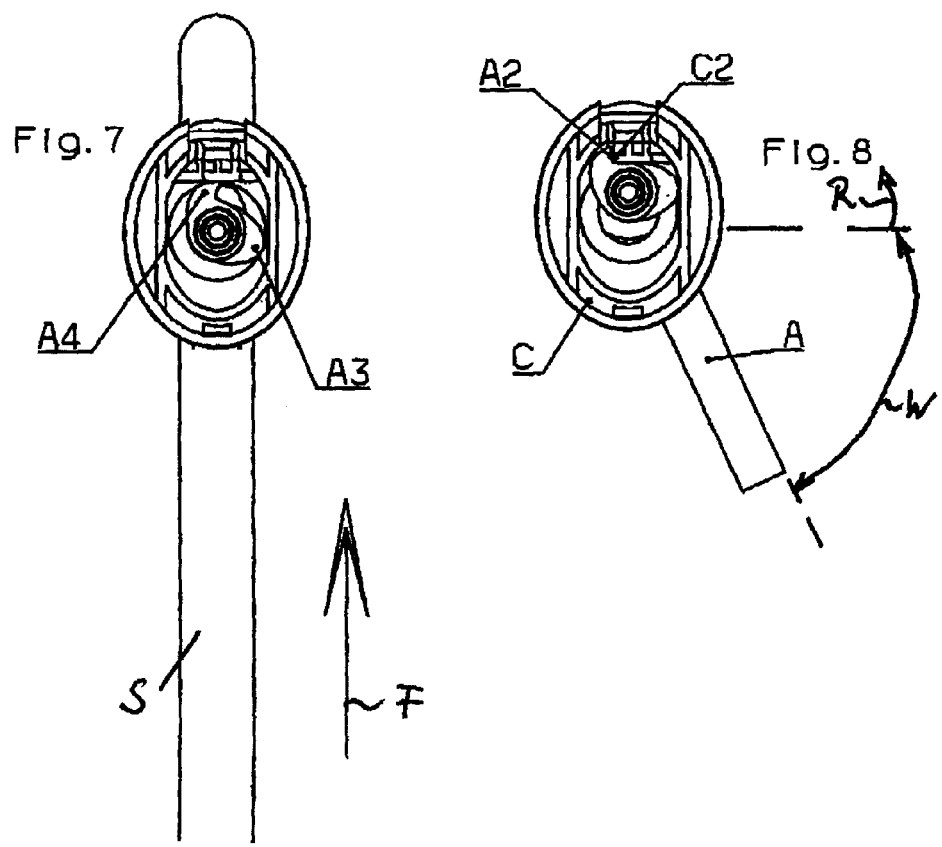

FIXTURE FOR A COMPONENT AND A FIXTURE MOUNT

CROSS REFERENCE TO RELATED APPLICATIONS

None.

BACKGROUND OF THE INVENTION

1. Field of the Invention

The present invention relates to a fixture for a component, in particular for a sun visor of a motor vehicle, and to the component. Furthermore, the present invention relates to the mounting of the fixture and the mounting of the component.

2. Related Art

On account of the diversity of trims in vehicles, the outlay in terms of time and costs for mounting the trim components is very high.

Since snap fastenings can easily be damaged during fitting, the publication DE 103 01 663 A1 discloses a device for fastening a sun visor, with a support and a pivoting element, which is arranged in the support in a manner such that it can pivot about a pivot axis, and with an arm, which is arranged in a hole in the pivoting element. A lateral movement of the arm causes the pivoting element to enter into engagement on flexible means of the support, and therefore the support is fastened to the mounting surface. The snap fastening can be fitted without further aids. However, the support has a right-angled first opening through which the pivoting element is visible, so that the lateral movement can be carried out in order to mount the support.

It is therefore the object of the invention to provide a fixture for a component and a component, in particular for a vehicle, which can be produced and fitted very rapidly, simply and cost-effectively and which has a visually very attractive design.

SUMMARY OF THE INVENTION

The object is achieved by a fixture, in particular for a sun visor and in particular for a vehicle, comprising a covering element with a latching means, and a basic body, which are arranged along a spindle element, the spindle element having a positioning means for adjusting the latching means from a mounting position into a fitted position, and the fixture being latched to the fitted body in the fitted position by means of the latching means. The fixture is therefore held securely on the fitted body in the fitted position. According to the invention, the positioning means makes it possible for the fixture to be fitted on the fitted body in an interlocking and/or frictional manner by adjustment of the spindle element relative to the covering element or of the covering element relative to the spindle element. In the fitted position of the latching means, the covering element and the basic body are in engagement with each other, with the fitted body and with the spindle element in an interlocking and/or frictional manner such that the spindle element is fastened to the fitted body.

The positioning means is arranged in the region of the latching means by means of which the fixture is latched to the fitted body. It is therefore not visible to a user and therefore does not affect the visual impression, for example of a sun visor.

The covering element and the basic body interact with the fitted body and the spindle element in an interlocking and/or frictional manner. Further aids or tools, in particular screws, rivets or other components, are therefore not required in order to fasten the spindle element to the fitted body, and the mounting of the fixture is possible in a very simple and rapid and therefore cost-effective manner entirely by arranging and adjusting said structural elements of the fixture relative to one another and to the fitted body.

In a preferred embodiment, the fitted body extends in an essentially planar manner and the spindle element is arranged in a cutout of the fitted body, particularly preferably in a hole, essentially in the direction of an axis. The production of a hole is possible cost-effectively.

The spindle element preferably forms an axis about which it is rotatable. When a component is arranged in the spindle element, the component is therefore rotatable about the axis. The spindle element serves as a tool during the mounting of the fixture.

The latching means is adjustable by rotation of the spindle element about the axis. The lever arm of the spindle element can be used in the fitting of the fixture, in particularly for a sun visor with an L-shaped spindle element, as a result of which the mounting, in particular the adjustment of the latching means from the mounting position into the fitted position, is very easy for the fitter.

In one embodiment, the basic body has a projection which forms a gap in which the fitted body is at least partially arranged in the fitted position. By means of the arrangement of at least part of the fitted body in the gap, the relative position of the fixture with respect to the fitted body is fixed.

The basic body may include a holding means which is at least partially arranged in a receptacle of the covering element. As a result, the basic body and the covering element are secured against rotation relative to each other.

Furthermore, the covering element may have a recess which, in the fitted position, interacts in an interlocking and/or frictional manner with an integral formation on the basic body. The integral formation may be hook-shaped and secures the latching means in the fitted position.

The spindle element may have a holding surface with which it interacts with a bearing surface of the covering element in an interlocking and/or frictional manner, and therefore the covering element is held in a relative position with respect to the spindle element in the direction of the axis by means of the holding surface.

The spindle element may include a stop means with which it interacts with the basic body. A stop means prevents the spindle element from being pushed too far in the direction of the axis into the basic body.

Likewise, the stop means can have a stop surface for interaction with a mating stop surface of the covering element, which stop surface prevents the rotation of the spindle element or the covering element about the axis in one of the two opposite directions of rotation during the mounting of the covering element and the spindle element.

The covering element, the basic body and the spindle element may be manufactured from a plastic, as a single piece, and therefore their production is cost-effective. The spindle element may be reinforced by means of a metal insert, for example a steel insert, and/or contains a tube for the guidance of the electrical wiring of the sun visor.

A further subject matter of the present invention is a method for mounting a fixture in a vehicle, which comprises the steps of:

pushing a covering element in the direction of the axis onto a spindle element, rotating the covering element in one direction of rotation and rotating the spindle element in the opposite direction of rotation, pushing the basic body in the direction of rotation of the axis onto the spindle element, arranging the holder in a cutout of the fitted body, rotating the spindle element in the direction of rotation, and rotating the spindle element in the opposite direction of rotation, in this sequence. According to the invention, the method includes the arranging and also translational and rotational adjustment of the components of the fixture and of the fitted body relative to one another. The fitting is possible without further aids and tools, the fitter therefore has both hands available during the fitting, and therefore the fitting is possible simply, rapidly and cost-effectively.

A further subject matter of the present invention is a method for mounting a component in a vehicle, which comprises the steps of arranging the component on a spindle element of a fixture according to the invention, and mounting the fixture in accordance with the method according to the invention, with it being possible for the step sequence to be swapped. Depending on the possibilities of mounting the fixture and the component, in particular the space conditions during the mounting, the component may either be preassembled with the fixture, which is preferable for safety reasons and for cost reasons, and may then be mounted finally in the cutout of the fitted body. Or the fixture is mounted first and subsequently the component is arranged on the spindle element. The method can therefore be adapted in a flexible manner to the space conditions during the mounting.

A further subject matter of the present invention is a component which comprises a fixture according to the invention, by means of which it is arranged in a vehicle, in particular in a motor vehicle. The component can be mounted very rapidly, simply and without a tool. A component of this type is preferably a sun visor, a mirror, for example a rear view mirror, a grab handle, which is arranged, for example, above the door or in a door of a vehicle, or a hook, for example for hanging items of clothing on.

BRIEF DESCRIPTION OF THE DRAWINGS

The invention is described below by figures. The figures are merely by way of example and do not restrict the general concept of the invention.

FIG. 1 shows a component according to the invention which is arranged on a fitted body by means of a fixture according to the invention.

FIG. 2 shows a fixture according to the invention in an exploded illustration.

FIG. 3 shows the component of FIG. 1 arranged in the fitted body.

FIGS. 4-8 show the fitting of a component according to the invention into a fitted body.

DETAILED DESCRIPTION OF THE PREFERRED EMBODIMENT

Figure 10:
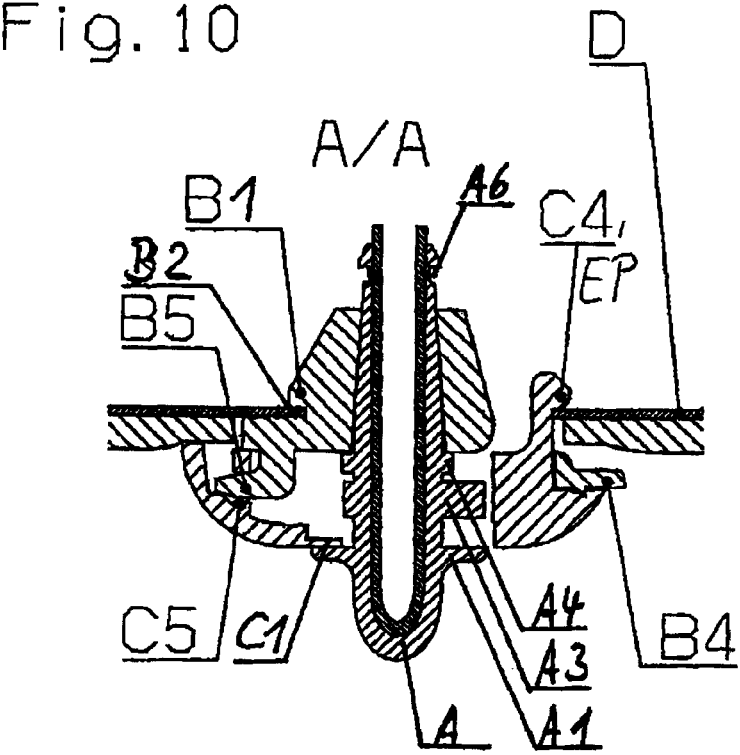
FIG. 10 shows the section A-A of FIG. 1 through the fixture according to the invention.

FIG. 1 shows a component according to the invention which is arranged on a fitted body D by means of a fixture H according to the invention. The component is a sun visor S and is arranged by means of the fixture H on the vehicle roof lining which forms the fitted body D. The terms roof lining and fitted body D and also component and sun visor S are used synonymously below. The sun visor S is arranged rotatably about an axis A5 of the fixture H and is mounted at a counter bearing G in the roof lining D by means of the fixture H, on the one hand, and in a releasable manner, on the other hand. After the sun visor S is released from the counter bearing G, it can be rotated about the axis A5 of the fixture H.

FIG. 2 shows a fixture H according to the invention in an exploded illustration. FIG. 2 shows the basic body B, the covering element C and the spindle element A in the sequence in which they are arranged along the axis A5 from the spindle element A. The basic body B has a projection B1 which forms a gap B2 in which the fitted body D is at least partially arranged in the fitted state. The fitted body D is not shown in FIG. 2. The covering element C has a receptacle C5 in which a holding means B5 of the basic body B is arranged in the fitted state. Furthermore, the covering element C has a recess C3 which interacts with an integral formation B3 on the basic body B, which integral formation is arranged on the latching surface B4 of the basic body B and holds a latching means C4 of the covering element C in a fitted position EP, see FIG. 10. The spindle element A has a holding surface A1 which bears against a bearing surface C1 of the covering element C in the fitted state. In addition, the spindle element A has a stop means A4 with a stop surface A2 which, during mounting of the fixture, interacts at least temporarily with a mating stop surface C2 of the latching means C4. Furthermore, the spindle element A has a positioning means A3 by means of which the latching means C4 is adjusted during the mounting from a mounting position MP, see FIG. 6, into the fitted position EP.

In a region in which it interacts with the spindle element A in an interlocking and/or frictional manner, the basic body B has indentations B7 such that it can be matched flexibly to the diameter of the spindle element A as it is being pushed onto the spindle element A. In this region, the spindle element A is shaped essentially conically. After the basic body B is pushed onto the spindle element A, the basic body B engages by means of engagement means B6 in notches A6 of the spindle element A such that the basic body B is fixed on the spindle element A.

FIG. 3 shows the sun visor S of FIG. 1 arranged on the fitted body. The sun visor S is released from the counter bearing G and the spindle element A of the fixture H rotated through an angle W such that the sun visor S is rotated. The direction of travel is indicated by means of an arrow F.

FIGS. 4-8 show the fitting of a component S according to the invention into a fitted body D by means of a fixture H according to the invention. The figures show a sun visor S as the component according to the invention. The fitted body is the roof lining D of a motor vehicle. The fitted body D is not shown in FIGS. 5-8.

FIG. 4 shows the mounting of the sun visor in the roof lining D, for example of a motor vehicle, by means of the fixture H according to the invention which has already been assembled. The fixture H is arranged in a fitting direction, which is indicated by means of an arrow E, in a cutout D1 of the fitted body D in the direction of the axis A5 of the spindle element A.

FIG. 5-8 show the mounting of the fixture H.

FIG. 5 shows the fixture H with the basic body B while the basic body B is omitted in FIGS. 6-8 for clarification purposes. The sun visor S is released from the counter bearing G and, rotated in a direction of rotation R through an angle W, which is preferably approx. 15-25°, particularly preferably approx. 20°, fitted into the cutout D1 of the fitted body D. The direction of travel is again indicated by means of an arrow F.

First of all, the covering element C is pushed in the direction of the axis A5 onto the spindle element A into the bearing surface C1 of the covering element C bears against the holding surface A1 of the spindle element A. The spindle element A is then rotated in the direction of rotation R, here the counterclockwise direction, and the covering element C is rotated in the opposite direction of rotation GR, here the clockwise direction, until the stop surface A2 of the spindle element A interacts with the mating stop surface C2 of the covering element C, see FIG. 8. The terms direction of rotation R and counterclockwise direction, and also opposite direction of rotation GR and clockwise direction as used synonymously below. In this position, the covering element C cannot be rotated in the counterclockwise direction R and the spindle element A cannot be rotated in the clockwise direction GR. The basic body B is then pushed in the direction of the axis A5 onto the spindle element A, with the holding means B5 of the basic body B being arranged in a receptacle C5 of the covering element C. The fixture H is subsequently arranged in a cutout D1 of the fitted body D such that the fitted body D is at least partially arranged in a gap B2 of the basic body B and the latching means C4 of the covering element C interacts with the fitted body D in an interlocking and/or frictional manner.

For this purpose, with the fixture H preassembled, starting from FIG. 8, in which the sun visor S is rotated in the opposite direction of rotation GR through an angle W of preferably 55-75°, particularly preferably approx. 65°, the sun visor S is arranged below the cutout D1 of the roof lining D, and therefore the cross section of the basic body B essentially corresponds to the contour of the cutout D1 and therefore the basic body B can be guided through the cutout D1 until the covering element C bears at least partially against the roof lining D. The sun visor S is then rotated in the counter bearing G in the direction of rotation R until the latching means is adjusted from its mounting position onto the fitted position by means of the positioning means. The adjustment of the latching means C4 by displacement of the center of gravity of the fixture H can at least be felt and possibly heard by the fitter. In the fitted position EP, the integral formation B3 on the basic body B latches in the recess C3 of the covering element C, and therefore the latching means C4 can no longer be reset into the mounting position MP. The sun visor S can subsequently be reset in the opposite direction of rotation GR and arranged on the counter bearing G.

In order to release and to remove the fixture H and/or the sun visor S from the cutout D1 of the roof lining D, the sun visor S is rotated in the opposite direction of rotation GR about an angle W of approx. 40-50°, preferably approx. 45°. The latching surface B4 is subsequently raised such that the integral formation B3 no longer engages in the recess C3. The covering element C can then be displaced along the roof lining D and can take the fixture H out of the cutout D1.

FIG. 7 shows the sun visor S after being released from the counter bearing G and rotating in the opposite direction of rotation GR such that it is arranged essentially parallel to the direction of travel F. A sun visor S of a motor vehicle adopts this position, in particular if an airbag arranged laterally in the region of the roof lining D or of the A-pillar is triggered. In this position, the stop means A4 of the spindle element A forms a stop, and therefore the integral formation B3 cannot be released from the recess C3 and the latching of the fixture H is additionally secured.

Figure 9:
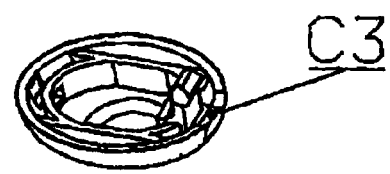
FIG. 9 shows the covering element of the fixture in a further prospective view.

FIG. 9 shows the covering element C of the fixture H in a further perspective view. In particular, the recess C3 of the covering element C can be seen.

FIG. 10 shows the section A-A of FIG. 1 through the fixture H according to the invention in the fitted state and in the fitted position EP of the latching means C4 in the cutout D1 of the fitted body D. The spindle element A with the holding surface A1, the stop means A4, the positioning means A3 and the notch A6, the covering element C with the bearing surface C1, the receptacle C5 and the latching means C4 in the fitted position EP, the basic body B with the projection B1, the gap B2, the latching surface B4 and the holding means B5, which is at least partially arranged in the receptacle C5, and the fitted body D, which is at least partially arranged in the gap B2, can be seen.

Figure 11:
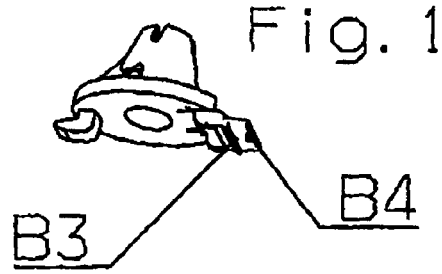
FIG. 11 shows the basic body in a further perspective view.

FIG. 11 shows the basic body B of the fixture H in a further perspective view. In particular, the integral formation B3 on the latching surface B4 of the basic body B can be seen.

LIST OF DESIGNATIONS

A Spindle element
A1 Holding surface
A2 Stop surface
A3 Positioning means
A4 Stop means
A5 Spindle
A6 Notch
B Basic body
B1 Projection
B2 Gap
B3 Integral formation
B4 Latching surface
B5 Holding means
B6 Engagement means
B7 Indentation
C Covering element
C1 Bearing surface
C2 Mating stop surface
C3 Recess
C4 Latching means
C5 Receptacle
D Fitted body, roof lining
D1 Cutout of the fitted body
G Counter bearing
H Fixture
S Component, sun visor
F Direction of travel
E Fitting direction
R Direction of rotation
GR Opposite direction of rotation
MP Mounting position of the latching means
EP Fitted position of the latching means The foregoing invention has been described in accordance with the relevant legal standards. Furthermore, the reference characters are merely for convenience and not to be considered in any way limiting. Variations and modifications to the disclosed embodiment may become apparent to those skilled in the art and fall within the scope of the invention. Accordingly, the scope of legal protection afforded this invention can only be determined by studying the following claims.

The invention claimed is:

1. A fixture (H) for joining a vehicular sun visor (S) to a fitted body (D), said fixture (H) comprising:
   a covering element (C) including a latching means (C4);
   a basic body (B), said covering element (C) and said basic body (B) arranged along a spindle element (A);
   characterized in that said spindle element (A) has a positioning means (A3) for adjusting said latching means (C4) from a mounting position (MP) into a fitted position (EP), with the fixture (H) being latched to the fitted body (D) in the fitted position (EP) by means of said latching means (C4), said fitted body (D) extends in an essentially planar manner and said spindle element (A) is arranged in a cutout (D1) of the fitted body (D) essentially in the direction of an axis (A5) extending along said spindle element (A), and said latching means (C4) is adjustable by rotation of said spindle element (A) about said axis (A5).

2. The fixture (H) as in claim 1, wherein said spindle element (A) is rotatable about said axis (A5).

3. A fixture (H) for joining a vehicular sun visor (S) to a fitted body (D), said fixture (H) comprising:
   a covering element (C) including a latching means (C4);
   a basic body (B), said covering element (C) and said basic body (B) arranged along a spindle element (A);
   characterized in that said spindle element (A) has a positioning means (A3) for adjusting said latching means (C4) from a mounting position (MP) into a fitted position (EP), with the fixture (H) being latched to the fitted body (D) in the fitted position (EP) by means of said latching means (C4) and said basic body (B) has a projection (B1) which forms a gap (B2) in which said fitted body (D) is at least partially arranged in the fitted position (EP).

4. The fixture (H) as in claim 3, wherein said spindle element (A) has a stop means (A4) with which it interacts, in the fitted position (EP), in an interlocking and/or frictional manner with said basic body (B).

5. The fixture (H) as in claim 4, wherein said stop means (A4) has a stop surface (A2) for interaction with a mating stop surface (C2) of said covering element (C).

6. A fixture (H) for joining a vehicular sun visor (S) to a fitted body (D), said fixture (H) comprising:
   a covering element (C) including a latching means (C4);
   a basic body (B), said covering element (C) and said basic body (B) arranged along a spindle element (A);
   characterized in that said spindle element (A) has a positioning means (A3) for adjusting said latching means (C4) from a mounting position (MP) into a fitted position (EP), with the fixture (H) being latched to the fitted body (D) in the fitted position (EP) by means of said latching means (C4) and said basic body (B) has a holding means (B5) which is at least partially arranged in a receptacle (C5) of said covering element (C).

7. A fixture (H) for joining a vehicular sun visor (S) to a fitted body (D), said fixture (H) comprising:
   a covering element (C) including a latching means (C4);
   a basic body (B), said covering element (C) and said basic body (B) arranged along a spindle element (A);
   characterized in that said spindle element (A) has a positioning means (A3) for adjusting said latching means (C4) from a mounting position (MP) into a fitted position (EP), with the fixture (H) being latched to the fitted body (D) in the fitted position (EP) by means of said latching means (C4) and said covering element (C) has a recess (C3) which, in the fitted position (EP), interacts in an interlocking and/or frictional manner with an integral formation (B3) on said basic body (B).

8. A fixture (H) for joining a vehicular sun visor (S) to a fitted body (D), said fixture (H) comprising:
   a covering element (C) including a latching means (C4);
   a basic body (B), said covering element (C) and said basic body (B) arranged along a spindle element (A);
   characterized in that said spindle element (A) has a positioning means (A3) for adjusting said latching means (C4) from a mounting position (MP) into a fitted position (EP), with the fixture (H) being latched to the fitted body (D) in the fitted position (EP) by means of said latching means (C4) and said spindle element (A) has a holding surface (A1) with which it interacts, in the fitted position (EP), in an interlocking and/or frictional manner with a bearing surface (C1) of said covering element (C).

9. A component (S) for mounting to a fitted body (D) within the interior passenger compartment in a vehicle, said component (S) comprising:
   a covering element (C) including a latching means (C4);
   a basic body (B), said covering element (C) and said basic body (B) arranged along a spindle element (A);
   characterized in that said spindle element (A) has a positioning means (A3) for adjusting said latching means (C4) from a mounting position (MP) into a fitted position (EP), with the component (S) being latched to the fitted body (D) in the fitted position (EP) by means of said latching means (C4) and said basic body (B) has a projection (B1) which forms a gap (B2) in which said fitted body (D) is at least partially arranged in the fitted position (EP).

* * * * *